United States Patent
Shoaf et al.

(10) Patent No.: US 7,396,871 B2
(45) Date of Patent: Jul. 8, 2008

(54) RUBBER MODIFIED ACRYLIC AND/OR VINYL HYBRID RESINS

(75) Inventors: Glenn Lewis Shoaf, Kingsport, TN (US); Mark Kevin Vineyard, Blountville, TN (US)

(73) Assignee: Eastman Chemical Comapny, Kingsport, TN (US)

( * ) Notice: Subject to any disclaimer, the term of this patent is extended or adjusted under 35 U.S.C. 154(b) by 0 days.

(21) Appl. No.: 10/319,151

(22) Filed: Dec. 13, 2002

(65) Prior Publication Data

US 2003/0158331 A1 Aug. 21, 2003

Related U.S. Application Data

(60) Provisional application No. 60/349,006, filed on Jan. 14, 2002.

(51) Int. Cl.
C08K 3/00 (2006.01)

(52) U.S. Cl. .................. 524/575.5; 525/333.1; 525/242; 525/244; 525/326.1; 525/331.9

(58) Field of Classification Search .............. 524/575.5; 525/333.1, 242, 244, 326.1, 331.9
See application file for complete search history.

(56) References Cited

U.S. PATENT DOCUMENTS

| 2,551,600 | A | * | 5/1951 | Holland et al. ............... 524/432 |
| 3,970,623 | A | | 7/1976 | Feeney et al. |
| 4,011,388 | A | | 3/1977 | Murphy et al. |
| 4,346,199 | A | * | 8/1982 | Peng et al. .................. 525/316 |
| 4,411,954 | A | | 10/1983 | Butch, III et al. |
| 4,460,728 | A | | 7/1984 | Schmidt, Jr. et al. |
| 4,526,577 | A | | 7/1985 | Schmidt, Jr. et al. |
| 4,879,333 | A | | 11/1989 | Frazee |
| 5,071,904 | A | | 12/1991 | Martin et al. |
| 5,095,065 | A | | 3/1992 | Yang |
| 5,290,867 | A | | 3/1994 | Gilg et al. |
| 5,296,530 | A | | 3/1994 | Bors et al. |
| 5,349,026 | A | | 9/1994 | Emmons et al. |
| 5,371,148 | A | | 12/1994 | Taylor et al. |
| 5,494,975 | A | | 2/1996 | Lavoie et al. |
| 5,525,662 | A | | 6/1996 | Lavoie et al. |
| 5,569,715 | A | | 10/1996 | Grandhee |
| 5,686,518 | A | | 11/1997 | Fontenot et al. |
| 5,728,759 | A | * | 3/1998 | Pike ............................ 524/270 |
| 6,054,531 | A | * | 4/2000 | Craig ........................... 525/64 |
| 6,162,848 | A | | 12/2000 | Lattime et al. |
| 6,333,378 | B1 | | 12/2001 | Clark et al. |

FOREIGN PATENT DOCUMENTS

| CN | 1121931 A | * | 5/1996 |
| CN | 1337416 A | | 2/2002 |
| EP | 0 688 843 A1 | | 12/1995 |
| GB | 728 044 A | | 4/1955 |
| GB | 832822 A | | 4/1960 |
| GB | 935996 A | | 9/1963 |
| JP | 05287121 A | | 11/1993 |
| JP | 5331421 | | 12/1993 |
| JP | 8269142 | | 10/1996 |
| JP | 08269142 A | * | 10/1996 |
| JP | 11147993 | | 6/1999 |
| JP | 11147993 A | * | 6/1999 |
| JP | 11322863 | | 11/1999 |
| JP | 11322863 A | * | 11/1999 |
| WO | WO 98/42761 A1 | | 10/1998 |

OTHER PUBLICATIONS

Wang et al., "Emulsion and Mini-Emulsion Copolymerization of Acrylic Monomers in the Presence of Alkyd Resin," *Journal of Applied Science*, vol. 60, pp. 2069-2076, (1996).

* cited by examiner

*Primary Examiner*—Peter D. Mulcahy
(74) *Attorney, Agent, or Firm*—Polly C. Owen; Bernard J. Graves, Jr.

(57) ABSTRACT

This invention relates to a rubber modified acrylic and/or vinyl resin comprising the mini-emulsion polymerization product of at least one rubber compound substantially dissolved in at least one acrylic monomer and/or vinyl monomer.

53 Claims, 2 Drawing Sheets

Figure 1

Figure 2
Shear Stability Test
Step Stress (250 dynes/cm$^2$)

RUBBER MODIFIED ACRYLIC AND/OR VINYL HYBRID RESINS

RELATED APPLICATIONS

This application claims priority of provisional application U.S. Ser. No. 60/349,006 entitled "Rubber Modified Acrylic Hybrid Resins" filed on Jan. 14, 2002.

FIELD OF THE INVENTION

The invention relates to the mini-emulsion polymerization product of a least one rubber compound substantially dissolved in at least one acrylic and/or vinyl monomer. The rubber modified acrylic and/or vinyl hybrid resin of the invention exhibits both high shear strength and mechanical stability. Rubber modified acrylic and/or vinyl hybrid resins are useful as adhesives, including pressure sensitive adhesives such as tapes, labels, stickers, decals, decorative vinyls, laminates, and wall coverings.

BACKGROUND OF THE INVENTION

Pressure sensitive adhesives are widely used in the adhesive industry. Large quantities of pressure sensitive adhesives (PSAs) are used in the production of masking tape and labels. Conventional PSAs may contain natural rubber or other similar elastomeric compounds and are either solvent-based or water-based. In solvent-based PSAs, the solids are dissolved in an organic liquid. In water-based PSAs, the solid components are dispersed in water.

In response to safety and environmental concerns, the use of water-based PSAs has grown. Though most water-based PSAs exhibit good shear strength, their solvent-based counterparts exhibit superior shear strength. In addition, natural rubber latex often exhibits poor mechanical stability and thus limits the methods by which it can be applied.

U.S. Pat. No. 4,011,388 describes a process for the preparation of aqueous homogeneous polymer emulsion which comprises mixing, generally with agitation or under shear conditions, water, surfactant, at least one polymer, e.g. cellulosic compounds, and at least one monomer, e.g. acrylics, methacrylics, styrene, etc., the polymer being soluble in said monomer, to form a dispersion of polymer-monomer particles in water; then subjecting said dispersion to conditions such that the monomer within the particles become polymerized by free radical polymerization thereby forming a substantially homogeneous blend of at least two polymers within the particles of the emulsion.

U.S. Pat. No. 5,686,518 describes a process for incorporating a polymer soluble in one or more of the monomers into an emulsion polymer. The monomer mix is subjected to high shear to form small droplets in the range of 10 to about 500 nm to form a mini-emulsion. The incorporated polymer level is limited to 0.5-5.0% based on the combined weight of monomer and polymer.

U.S. Pat. No. 5,071,904 describes a process for incorporating a hydrophobe (greater than 30 weight % based on combined weight of monomer and polymer) into a microparticle. Their system requires the use of a functional polymer (eg. hydroxyl group) and the use of a cross-linking agent (e.g. melamine formaldehyde or a blocked polyisocyanate).

U.S. Pat. No. 5,569,715 describes a process for forming a hydrophobically modified core polymer as part of a core-shell polymer. The core is made by mixing a hydrophobic polymer, monomer(s), water, and surfactant then subjecting to high shear to form surfactant stabilized particles (droplets) between 100 and 300 nm. This core material is polymerized. Then a hydrophilic shell is formed using conventional emulsion polymerization with at least one hydrophilic monomer.

WO 98/42761 describes a process for modifying natural rubber by swelling existing natural rubber latex particles with small quantities of vinyl and/or acrylic monomer, then initiating reaction of the monomer in the swollen latex particles. The process is most similar to a seeded emulsion polymer process.

U.S. Pat. No. 4,346,199 describes the use of myrcene to promote grafting of natural rubber latex to alkenyl aromatic and alkenyl nitrile monomers. The grafted and non-grafted portions of the final product are separated and made into sheeting.

U.S. Pat. No. 5,728,579 describes a method for blending various latexes, curing agents, tackifiers, and plasticizers followed by a heated curing step for use in pressure sensitive adhesive applications.

Japanese Patent 05287121 describes a process for modifying a natural rubber latex by adding small amounts of acrylic and vinyl monomers plus additional water and surfactant, then polymerizing the acrylic monomers through the addition of heat and an initiator. The acrylic monomers graft to the natural rubber forming an acrylic-modified natural rubber latex. However, these processes start with natural rubber in latex form and do not provide for pre-dissolution of rubber(s) into acrylic and/or vinyl monomer(s), forming of a mini-emulsion, and subsequent polymerization to form a hybrid latex.

U.S. Pat. No. 5,095,065 (Yang) describes a process for incorporating a low molecular weight tackifier by pre-dissolution in monomer followed by incorporation into a latex under conventional emulsion polymerization conditions.

U.S. Pat. No. 6,333,378 (Clark et al.) describes water-based latexes of a acrylic-modified alkyd or uralkyd resin or hybrid resin which can be prepared by emulsion polymerization as well as by mini-emulsion polymerization.

There exists a need in the art for water-based adhesives that afford both excellent shear strength and mechanical stability without the production of undesirable scrap levels. The invention, as described below, addresses such a need.

DETAILED DESCRIPTION OF THE DRAWINGS

SUMMARY OF THE INVENTION

First, the invention provides a rubber modified acrylic resin comprising the mini-emulsion polymerization product of at least one rubber substantially dissolved in at least one acrylic and/or vinyl monomer.

Second, the invention provides a water-based hybrid latex comprising water and a rubber modified acrylic and/or vinyl hybrid resin, wherein said rubber modified acrylic and/or vinyl hybrid resin comprises the mini-emulsion polymerization product of a rubber compound substantially dissolved in at least one acrylic monomer and/or vinyl monomer.

Third, the invention provides adhesive compositions comprising the water-based latex of the rubber modified acrylic and/or vinyl resin of the invention.

Fourth, the invention provides a method of preparing a water-based latex comprising the steps of shearing a solution to produce a mini-emulsion and polymerizing the mini-emulsion wherein said solution comprises an aqueous dispersion of one or more rubber compounds substantially dissolved in at least one acrylic and/or vinyl monomer.

Fifth, the invention provides a method of preparing a water-based latex comprising the steps of: substantially dissolving at least one rubber compound in at least one acrylic monomer and/or vinyl monomer to form a rubber compound/acrylic monomer and/or vinyl monomer solution; dispersing the rubber compound/acrylic monomer and/or vinyl monomer solution in an aqueous medium to form a pre-emulsion; shearing said pre-emulsion to form a mini-emulsion; and subsequently polymerizing said mini-emulsion.

This invention provides advantages over the art including, but not limited to, environmental friendliness, superior shear strength, and good mechanical stability, without sacrificing other important adhesive properties such as peel strength, loop tack, etc. Another advantage of this invention is one of combining rubber monomers with acrylic monomers and/or vinyl monomers prior to polymerizing. The additional step of dispersing a rubber compound in the latex after polymerization is not required. The invention is further advantageous in that the process uses mini-emulsion polymerization and avoids the process difficulties that occur when rubber compounds and acrylic and/or vinyl monomers are polymerized using conventional emulsion polymerization processes, namely, the production of undesirable scrap levels and grit. Surfactants normally required to disperse the rubber compound are not necessary.

DETAILED DESCRIPTION OF THE INVENTION

This invention provides a rubber modified acrylic and/or vinyl hybrid resin comprising the mini-emulsion polymerization product of at least one rubber compound substantially dissolved in at least one acrylic and/or vinyl monomer. The water-based latex of the invention affords a stable, emulsion of the rubber modified acrylic and/or vinyl hybrid resin of the invention. For the purposes of this invention, "water-based" is defined as comprising water.

The latex exhibits good mechanical stability and the resultant latex films, adhesives or coatings provide enhanced adhesive properties such as excellent shear strength. Thus, the water-based latexes of the invention offer the combined advantages of water-based and solvent-based systems of the prior art, i.e., high shear strength and good latex mechanical stability in an environmentally friendly water-based system. The hybrid resins of the invention are particularly useful in the preparation of pressure sensitive adhesives and coatings such as, for example, top coatings, protective coatings and decorative coatings.

The water-based latexes of the invention generally exist as particles dispersed in water. The particles may be structured or unstructured. Structured particles may include, but are not limited to core/shell particles and gradient particles. The core/shell polymer particles may be prepared in many forms, including but not limited to, a multi-lobe form, a peanut shell, an acorn form, or a raspberry form. It is preferred in such particles that the core portion comprises about 20 to about 80 wt. % of the total weight of the particle and the shell portion comprises about 80 to about 20 wt. % for the total weight of the particle. The average particle size of the acrylic and/or vinyl hybrid latex may range from about 25 to about 500 nm. Preferred particle sizes range from about 50 to about 300 nm, more preferably from about 100 to about 250 nm.

The glass transition temperature ($T_g$) of the acrylic and/or vinyl portion of the acrylic and/or vinyl hybrid resin or latex in accordance with the invention, may be up to about 60° C. The glass transition temperature may preferably be 20° C. or less where film formation of the latex at ambient temperature is desirable, more preferably, about 10° C. or less, and most preferably, about 0° C. or less. For adhesives compositions, the $T_g$ of the resin or latex may preferably be in a range between −60° C. and 10° C. The $T_g$ of the resin or latex is determined using differential scanning calorimetry (DSC).

Natural and synthetic rubbers are useful in this invention. Natural rubbers are derived from natural sources as opposed to synthetic sources. Natural rubber itself can be used in a latex form. However, in the prior art, natural rubber-based latexes typically do not exhibit good mechanical stability and are typically applied in a solvent-based system. The rubber compound useful in the rubber modified acrylic and/or vinyl hybrid resin of the invention may be any rubber known in the art, i.e. any natural or synthetic high polymer having unique properties of deformation (elongation or yield under stress) and elastic recovery. Such polymers are typically crosslinked, i.e., with sulfur in the vulcanization process.

The rubber compound useful in the invention is capable of being contacted with, combined with, mixed with or substantially dissolved in at least one acrylic monomer and/or vinyl monomer. Examples of suitable rubber compounds include, but are not limited to, natural rubber, butyl rubbers, isoprene rubbers, chloroprene rubbers including neoprene rubbers, polybutadiene rubbers, nitrile-butadiene rubbers, styrene-butadiene rubbers, polypentanamers, and ethylene-proplyene-diene terpolymers. Other pre-formed elastomers including acrylics and acrylic modified rubber compounds may also be included. In a preferred embodiment of the invention, the preferred rubber compound is natural rubber. As would be understood by one of skill in the art, natural rubber may exist either as a solid or as natural latex. Molecular weights (Mw) of the rubber compounds for use in the invention may range from about 2000 to about 2,000,000, preferably from about 40,000 to about 1,000,000. A rubber compound for use in the invention may be mechanically milled to reduce molecular weight and/or crystallinity to enhance solubility of the rubber compound in desired acrylic and/or vinyl monomers. The term "substantially dissolved in at least one acrylic monomer and/or vinyl monomer" means that at least 75% by weight of the rubber compound should form a single-phase liquid or solution in the acrylic monomer and/or vinyl monomer at the concentration specified. Preferably, the rubber compound is substantially dissolved in, and more preferably, completely dissolved in at least one acrylic monomer and/or vinyl monomer. Mixing, if necessary, of the rubber with the acrylic monomer and/or vinyl monomer may be accomplished by any means known in the art.

In the context of this invention, ethylenically unsaturated monomer(s) or compounds useful in this invention may be any acrylic and/or vinyl monomer or compound known in the art capable of solubilizing rubber. The ethylenically unsaturated monomer(s) or compounds can be added as a single type of monomer or as a mixture. Examples of suitable ethylenically unsaturated monomers include, but are not limited to, styrenic monomers such as, for example, styrene, α-methyl styrene, vinyl naphthalene, vinyl toluene, chloromethyl styrene and the like; ethylenically unsaturated species such as, for example, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, lauryl methacrylate, lauryl acrylate, octyl acrylate, octyl methacrylate, glycidyl methacrylate, allyl methacrylate, vinyl methacrylate, acetoacetoxyethyl methacrylate, acetoacetoxyethyl acrylate, acetoacetoxypropyl methacrylate, acetoacetopropryl acrylate, hydroxybutenyl methacrylate, the allyl or diallyl ester of maleic acid, poly(allyl glycidyl ether), alkyl crotonates, vinyl acetate, di-n-butyl maleate, di-octylmaleate, acrylonitrile, diacetone acrylamide, acrylamide, methacrylmide, hydroxyethyl methacrylate, hydroxyethyl acrylate, acrylonitrile, and the like; and nitrogen containing monomers including t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea, and the like. Butyl acrylate and ethylhexyl acrylate are preferred.

More preferably, a water-based latex of the invention is prepared under mini-emulsion polymerization conditions. Shearing of the solution of rubber compound substantially dissolved in acrylic monomer and/or vinyl monomer produces a mini-emulsion. The shearing can be conducted by any means known in the art. Generally, shearing can be achieved using a high shearing device to form droplets ranging in size from about 50 to about 500 nanometers to form the mini-emulsion. Although not being bound by any particular theory, it is believed that shearing the mixture to form small droplets, and thus forming the mini-emulsion, prior to polymerization, promotes that the predominant nucleation site and subsequent polymerization site occurs within the droplets. This minimizes transport of the monomer from the droplets which could result in precipitation of the rubber compound.

Preferably, a rubber compound is mixed with, combined with, contacted with, or substantially dissolved in at least one acrylic and/or vinyl monomer to form a rubber/acrylic monomer and/or vinyl monomer solution, the resulting solution is then dispersed in an aqueous medium to form a pre-emulsion, the pre-emulsion is sheared to form a mini-emulsion (sheared mini-emulsion), and then the mini-emulsion is polymerized. A mini-emulsion is defined as a homogenized aqueous emulsion of monomer containing a hydrophobic component which provides stability for those droplets to prevent or minimize coalescence.

A mini-emulsion polymerization process is used since mini-emulsion polymerization allows the preparation of high molecular weight polymers at low viscosity. The mini-emulsion, as described above, may also be polymerized as described in U.S. Pat. No. 5,686,518 and Wang et al., "Emulsion and Mini-emulsion Copolymerization of Acrylic Monomers in the Presence of Alkyd Resin," *Journal of Applied Polymer Science*, Vol. 60, pp. 2069-2076 (1996), each of which is incorporated in its entirety by reference. The preparation of mini-emulsion polymers of a rubber modified acrylic and/or vinyl resin is one possible solution for an adhesive composition which exhibits good mechanical stability in the latex form, and excellent shear strength after drying to form a permanently tacky film at room temperature.

The polymerization process by which the hybrid latexes are made may also require an initiator, a reducing agent, or a catalyst. Suitable initiators include conventional initiators such as ammonium persulfate, ammonium carbonate, hydrogen peroxide, t-butyl hydroperoxide, ammonium or alkali sulfate, di-benzoyl peroxide, lauryl peroxide, di-tertiarybutylperoxide, 2,2-azobisisobutyronitrile, benzoyl peroxide, and the like. Preferably, the hybrid latexes of the invention comprise a surfactant and an initiator.

Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to, AQUACAT™, ferrous sulfate heptahydrate, ferrous chloride, cupric sulfate, cupric chloride, cobalt acetate, cobaltous sulfate, and mixtures thereof.

A conventional surfactant or a combination of surfactants may be used as a stabilizer in the mini-emulsion polymerization of the invention. Generally, the surfactant is at least one selected from the group consisting of an anionic surfactant and/or a non-ionic surfactant. Examples of preferred surfactants include, but are not limited to, alkali alkylsulfate, ammonium alkylsulfate, alkylsulfonic acid, or fatty acid, oxyethylated alkylphenol, sulfosuccinates and derivatives, or any combination thereof. A list of suitable surfactants is available in the treatise: McCutcheon's Emulsifiers & Detergents, North American Edition, MC Publishing Co., Glen Rock, N.J., 1997. Preferably, the surfactant will provide droplet/particle stability, but result in minimal aqueous phase nucleation (micellar or homogeneous). Other surfactants that are useful to add to the aqueous composition are acetylenic diols and ethyloxylated acetylenic diols. Examples of acetylenic diols include, but are not limited to, Surfynol 104PG, Surfynol 440, Surfynol PSA336; all which are produced by Air Products. Polymerizable surfactants may be also used, for example, Hitenol BC-10, Hitenol HS 20 and Hitenol HS 10.

In general, the rubber portion of the hybrid latex represents about 1-30 weight %, preferably about 2-10 weight % of the total solids of the latex while the acrylic portion of the hybrid latex represents about 70-99 weight %, preferably about 90-98 weight % of the total solids of the latex. Such hybrid latexes can be further used in adhesive compositions.

An adhesive composition of the invention can be utilized to produce adhesives, especially pressure sensitive adhesives, coatings, and laminates. Pressure sensitive adhesives (PSA) are used in a variety of applications including tapes, labels, stickers, decals, decorative vinyls, laminates, and wall coverings.

An adhesive of the invention comprises a water-based latex of a rubber modified acrylic and/or vinyl hybrid resin of the invention and may be prepared by techniques known in the art, e.g. as disclosed in U.S. Pat. Nos. 4,879,333 and 5,728,759, each of which is incorporated by reference in its entirety. For example, the water-based latexes of the invention may be coated onto a substrate using techniques known in the art (e.g. roll-coating, curtain coating, gravure printing, slot die coating) to produce an adhesive or coated composition. The substrate can be any common substrate, such as, for example, paper, cardboard polyolefin films such as polyethylene and polypropylene, metals such as aluminum and steel, glass, urethane elastomers and primed (painted) substrates, and polyesters, including, but not limited to, terephthalate-based polyesters such as polyethylene terephthalate. The adhesive or coating composition of the invention may be cured at room temperature (ambient cure), at elevated temperatures (thermal cure), or radiation cured.

The acrylic portion of the hybrid resin retains the desirable properties of an acrylic of an acrylic PSA such as peel strength and loop tack while the rubber portion of the resin complements or enhances these properties as well as provides high shear strength. Adhesive compositions of the invention also offer the advantage of being water-based, i.e. and having significantly less solvent, less than 25 weight % to as low as 1 weight % and even zero volatile organic compound (VOC) content.

The water-based rubber modified acrylic hybrid latex of the invention may be combined with other PSA additives such as, for example, tackifiers or tackifying resins, dispersions, plasticizers, coalescing aids, solvents, wetting aids, defoamers, neutralants, preservatives, surfactants and the like. Specific examples of such additives can be found in Raw Materials Index, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference in its entirety.

The tackifying resins useful in the adhesives of the invention are added subsequent to the mini-emulsion polymerization used to prepare the rubber-modified acrylic and/or vinyl resins of the invention. Any tackifying resin known in the art that can yield the properties desired in the acrylic and/or vinyl resins or water-based hybrid latexes of the invention can be utilized. Tackifying resins useful in the adhesive compositions of the invention can be hydrocarbon resins, synthetic polyterpenes, rosin esters, rosin derivatives, rosin esters, natural terpenes, and the like. More particularly, useful tackifying resins include, but are not limited to, (1) natural and modified rosins and the hydrogenated derivatives thereof, such as, for example, gum rosin, wood rosin, tall-oil rosin, distilled rosin, hydrogenated rosin, dimerized rosin, polymerized rosin, the glycerol ester of rosin, the glycerol ester of hydrogenated rosin, the glycerol ester of polymerized rosin, and the pentaerythritol ester of hydrogenated rosin; (2) glycerol and pentaerythritol esters of natural and modified rosins and the hydrogenated derivatives thereof, such as, for example, the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) polyterpene resins and the hydrogenated derivatives thereof, having a softening point, as determined by ASTM Method E28-58T, of from about 80° C. to 150° C.; the latter polyterpene resins generally result from the polymerization of terpene hydrocarbons, such as the bicyclic monoterpene known as pinene, in the presence of Friedel-Crafts catalysts at moderately low temperatures; also included are the hydrogenated polyterpene resins; (4) phenolic modified terpene resins and the hydrogenated derivatives thereof, such as, for example, the resin product resulting from the condensation, in an acidic medium, of a bicyclic terpene and a phenol; (5) aliphatic petroleum hydrocarbon resins and the hydrogenated derivatives thereof, having a Ball and Ring softening point of from about 70° C. to 135° C.; the latter resins resulting from the polymerization of monomers consisting of primarily olefins and diolefins; also included are the hydrogenated aliphatic petroleum hydrocarbon resins; (6) aromatic hydrocarbon resins and the hydrogenated derivatives thereof include, for example, hydrocarbon resins derived from at least one alkyl aromatic monomer, such as for example, styrene, alpha-methyl styrene and vinyl toluene and the hydrogenated derivatives thereof; the alkyl aromatic monomers can be obtained from petroleum distillate fractions or from non-petroleum feedstocks, such as, for example, feedstocks produced from phenol conversion processes; and (7) alicyclic petroleum hydrocarbon resins and the hydrogenated derivatives thereof. Mixtures of two or more of the above described tackifying resins may be required for some formulations.

Examples of tackifying resins that can be post-added to the resins of the invention are disclosed in U.S. Pat. No. Nos. 4,526,577, 4,460,728 and 4,411,954; all of which are incorporated herein by reference in their entirety. Preferred post-added tackifying resins comprises Tacolyn 1070, Tacolyn 3179H, Tacolyn 4603; all of which are tradenames of tackifying resins commercially available from Eastman Chemical Company.

Plasticizers useful in the invention are a known class of materials, sometimes called elastomer plasticizing oils. They include paraffinic and aromatic hydrocarbons, mixtures thereof and esters of aliphatic and aromatic acids (see U.S. Pat. No. 2,551,600 incorporated herein by reference in its entirety).

A preferred plasticizer for use in forming the adhesives of the invention is dioctyl phthalate, provided by Eastman Chemical Company. Any plasticizer known in the art can be utilized based on the adhesive properties desired. Examples of commercially available plasticizers for adhesives include "Hercolyn DE" (Eastman Chemical Company), "Neville NP10" (Neville Chemical Co.), and "Shellflex 371" (Shell Chemical Co.).

Any solvent known in the art can be utilized based on the properties desired. Examples of useful solvents and coalescing aids are well known and include but are not limited to ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, TEXANOL® ester alcohol (2,2,4-trimethyl-pentanediol monoisobutyrate (Eastman Chemical Company), and the like. Such solvents and coalescing aids may also include reactive solvents and coalescing aids such as diallyl phthalate, SANTOLINK XI-100® polyglycidyl allyl ether from Monsanto, and others as described in U.S. Pat. Nos. 5,349,026 and 5,371,148, incorporated herein by reference.

Stabilizers useful in the invention are a known class of materials, sometimes called antioxidants, and include, but are not limited to, hindered phenols, high aromatic secondary amines and phosphites. Mixtures of two or more such materials may be used in the new adhesives of the invention.

Preferred stabilizers for use in the invention are "Wingstay L", a dispersion of a hindered phenol in 50% water supplied by Goodyear and "BNX-1000" available from Mayzo Inc. which is a mixture of hindered amines, hindered phenols and phosphites dispersed in a fatty acid epoxy resin. Examples of other commercially available materials of this class include "Irganox 565 or 1010 or 1330" (Ciba-Geigy Corp.), "Ethanox 330" (Ethyl Corp.), "Ionol" (Shell Chemical), "Polygard HR" & "Naugard 445" (Uniroyal Co.) and "Borg-Warner 626" or trinonyl pyrophosphate [TNPP] (Chemical Additive Div., G E Co.). A particularly useful stabilizer, designated CACS, consists of a mixture of the following ingredients in the stated percentages by weight, namely, hindered phenol 20%, epoxy fatty acid 50%, trinonyl phenyl phosphite 25% and hindered amine 5%.

Neutralents to be added to the aqueous composition can be any neutralent known in the art. Suitable neutralents include, but are not limited to, alkali hydroxides and amines. Examples of alkali hydroxides include sodium hydroxide, potassium hydroxide, and lithium hydroxide. Examples of amines include ethanolamine, triethylamine, and dimethyl-ethanolamine. Other suitable neutralents are ammonium.

Articles of manufacture may also comprise the resins or water-based latexes of the invention.

For the examples of the invention, the following procedures or methods were used:

Formulations were coated to approximately 1-ml dry film thickness on a Mylar polyester film. A description of the tests performed on each formulation follows below:

180° Peels (PSTC-1):

Five specimens (1"×12") from each coated film were placed onto stainless steel panels and a 4.5-lb roller was passed over each specimen five times. Immediately after preparation the specimens were pulled at a 180° angle using an Instron instrument at a rate of 12 in/min. The reported values are an average of five tests.

Loop Tack (Modification of ASTM D-903):

The ends of 1"×12" specimens from each coated film were placed into the grips of an Instron instrument to form a loop (adhesive side down). The specimens were lowered onto a stainless steel panel at a rate of 12 in/min and then raised at the same rate as tack property was measured. The reported values are an average of five tests.

Polyken Probe Tack (from TMI's Polyken Test Manual):

Polyken probe tack was measured on 1-ml coated samples using a TMI (Testing Machine Inc.) Probe Tack Tester model 80-02-01 with a dwell time of 1 second and a speed of 0.05 cm/sec. The reported values are an average of 5 tests.

Rolling Ball Tack (PSTC-6):

Specimens were cut into 1"×18" lengths. Each specimen was placed onto the rolling ball apparatus with adhesive side up. A steel ball (7/16" in diameter) was rolled at a 21.5° angle onto the adhesive side up specimen. The distance from the point where the ball initially contacts the adhesive to where it stops was measured in inches. The reported values are an average of 5 tests.

Hold Power (PSTC-7):

Using a 1-ml coated Mylar film, specimens were cut into 0.5"×3" or 0.75"×3" lengths. A 0.5"×0.5" or a 0.75"×0.75" square of the adhesive specimen was centered onto a stainless steel panel and two passes were done using a 4.5-lb roller. A clamp was placed on the free end of the specimen ensuring that the clamp extended completely across the width and was properly aligned to distribute the load uniformly. The specimen was then placed in the test stand and a 1000 g mass was applied to the clamp. The time elapsed in which the specimen completely separated from the test panel was recorded. Holding power was collected at both room temperature and 50° C. The reported values are an average of 5 tests.

Quick Stick (PSTC-5):

Using a 1-ml coated Mylar film, specimens were cut into 1"×12" lengths. A specimen end was touched to the end of a test panel. Tension was relaxed and the specimen was allowed to drape smoothly onto the panel without any foreign pressure. The panel was immediately placed into the quick stick fixture and pulled at 90° angle on an Instron instrument at a rate of 12 in/min. The reported values are an average of 5 tests.

Mechanical Stability

The instrumentation used consists of a Dynamic Stress Rheometer, Model SR 200(RHEOMETRICS). The entire rheometer is located in a constant temperature/constant humidity controlled laboratory(72F., 50% RH). Test fixtures consisted of a 40 mm diameter cone and plate with a 0.04 radian cone angle. Samples of the polymer suspensions were filtered through a fine screen (60×40) prior to testing. Approximately 1.5 grams of the suspension were placed uniformly over the 40 mm plate such that the sample uniformly spreads over the overflow area as the cone fixture is lowered and the final gap is set (50 microns). A step stress program was used such that the shear stress at the start of the test increases almost instantly from zero to the desired stress level. The desired stress level for this shear stability test was set on 220 dynes/cm**2. This stress level was chosen so as to achieve a nominal shear rate of 1000 sec-1 for most of the samples analyzed. The duration of the test was chosen to be 7200 seconds(2 hours).

Failure of the sample in the shear stability test was usually indicated by a sudden increase in viscosity. However, other forms of failure were also noted. These forms of failure included erratic viscosity behavior and an unacceptable rate of increase in viscosity during the test. Acceptable samples generally have a low or unnoticeable rate of viscosity increase over the duration of the test.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Preparation of Rubber Modified Acrylic Latex

To a reactor consisting of a 1000 mL resin kettle equipped with a condenser, nitrogen purge, and a subsurface feed tube was added water (85.9 g). A nitrogen purge was begun and the contents heated and maintained at 80° C. Milled natural rubber (25.6 g, commercially available from Shurtape Technologies Incorporated of Hickory, N.C.) was dissolved in butyl acrylate (487.4 g). Water (247 g) and surfactant (9.5 g of Aerosol OT-NV 85%, commercially available from Cytec Industries, West Patterson, N.J.) were premixed. Next, hydroxyethyl acrylate (16.2 g), acrylic acid (10.8 g), and the monomer/natural rubber solution were added to the water/surfactant mixture to form a separate pre-emulsion. The pre-emulsion was sheared using an IKA (Model SD-45) rotor/stator homogenizer by pumping through a flow cell which surrounded the shearing device (approximately 3 minute residence time) with the homogenizer operating at 100% output to form a mini-emulsion. A portion of the mini-emulsion (99.6 g, 12.5%) was charged to the reactor. Ammonium persulfate (0.6 g) was mixed in water (25 g) and charged to the reactor. After 15 minutes the remaining mini-emulsion was fed over 180 minutes to the reactor. Simultaneously, an initiator feed composed of water (65.0 g), ammonium persulfate (0.85 g), and ammonium carbonate (0.85 g) was also fed over 180 minutes at a rate of 0.37 g/min. After the feeds ended, the reactor was held at 80° C. for 15 minutes, then a reductant solution consisting of water (6.5 g), isoascorbic acid (1.0 g), and 0.5% iron sulfate heptahydrate (1.2 g) was added to the reactor. A solution of water (15.5 g) and 70% t-butyl hydroperoxide (1.1 g) was then fed over 45 minutes. The reaction mix was then cooled. The latex was filtered through a 100 mesh wire screen and filterable solids or scrap collected. The droplet size (mini-emulsion), particle size, viscosity (Brookhaven), and pH of the resulting rubber modified acrylic hybrid resin latexes were determined. The droplet and particle sizes were measured using Mictrotrac UPA laser light-scattering device (180° backscattering). The droplets were diluted approximately 1:50 in a monomer saturated water solution. The particles were diluted approximately 1:50 in water. Property data of the rubber modified acrylic latex are summarized in Table 2.

Comparative Example 1

Preparation of Rubber Modified Acrylic Latex Without Shearing (Regular Emulsion Polymer)

A rubber modified acrylic hybrid resin was prepared following the procedure of Example 1, except that the pre-emulsion was NOT sheared to form a mini-emulsion. The property data of the non-sheared rubber modified acrylic latex are summarized in Table 2. As illustrated in Table 2, very high levels of scrap resulted due to precipitation of a significant portion of the natural rubber.

Example 2

Preparation of All Acrylic Latex

To a 1000 mL resin kettle equipped with a condenser, nitrogen purge, and a subsurface feed tube was added water (102.4 g). A nitrogen purge was begun and the contents heated and maintained at 80° C. Water (229 g) and surfactant (9.5 g of Aerosol OT-NV (sulfosuccinate) 85%, commercially available from Cytec Industries, West Patterson, N.J.) were premixed. Next, hydroxyethyl acrylate (16.2 g), acrylic acid (10.8 g), and butyl acrylate (513 g) were added to the water/surfactant mixture to form a separate pre-emulsion. A portion of the pre-emulsion (77.8 g, 10%) was charged to the reactor. Ammonium persulfate (0.6 g) was mixed in water (10 g) and charged to the reactor. After 15 minutes the remaining pre-emulsion was fed over 180 minutes to the reactor. Simultaneously, an initiator feed composed of water (80.0 g), ammonium persulfate (0.85 g), and ammonium carbonate (0.85 g) was also fed over 180 minutes at a rate of 0.45 g/min. After the feeds ended, the reactor was held at 80° C. for 15 minutes, then a reductant solution consisting of water (6.5 g), isoascorbic acid (1.0 g), and 0.5% iron sulfate heptahydrate (1.2 g) was added to the reactor. A solution of water (19.0 g) and 70% t-butyl hydroperoxide (1.1 g) was then fed over 45 minutes. The reaction mix was cooled. The latex was filtered through a 100 mesh wire screen and filterable solids or scrap collected. The particle size, viscosity (Brookhaven), and pH of the resulting alkyd/acrylic hybrid resin latexes were determined. The droplet and particle sizes were measured using Mictrotrac UPA laser light-scattering device (180° backscattering). The particles were diluted approximately 1:50 in water. Latex property data are summarized in Table 2.

Example 3

Hartex 103 Natural Rubber Latex

Hartex 103 natural rubber latex (62% solids) (100 g, commercially available from Firestone Synthetic Rubber and Latex Co., Akron, Ohio) was diluted with water to 55% solids.

Example 4

Cold Blend of All Acrylic Latex and Natural Rubber Latex

The all acrylic latex (100 g) of Example 2 was blended with Hartex 103 natural rubber latex (4.4 g) of Example 3 at room temperature. The property data of the cold blend are summarized in Table 2.

Example 5

Cold Blend of All Acrylic Latex Adjusted to pH 8.5 and Natural Rubber Latex

The all acrylic latex (100 g) of Example 2 was adjusted to pH 8.5 with 28% ammonium hydroxide and then blended with Hartex 103 natural rubber latex (4.4 g) of Example 3 at room temperature. The property data of the cold blend are summarized in Table 2.

TABLE 1

Composition Data of Examples 1-5 and Comparative Example 1.

| Example | Acrylic Monomer Wt. % (BOM) | Surfactant Wt. % (BOM + NR) | Total Solids Wt. % | Natural Rubber Wt. % (BOM + NR) |
|---|---|---|---|---|
| 1a, 1b, 1c NR @ 5% - Acrylic Hybrid | BA/HEA/AA = 94.8/3.1/2.1 | 1.5% Aerosol OT-NV | 54.5 | 4.75 |
| Comparative Example 1 NR @ 5% - Acrylic Hybrid | BA/HEA/AA = 94.8/3.1/2.1 | 1.5% Aerosol OT-NV | 53.8 | 4.75 |
| 2a, 2b, 2c, 2d | BA/HEA/AA = 95/3.0/2.0 | 1.5% Aerosol OT-NV | 54.2 | 0.0 |
| 3 | N/a | N/a | 55.0 | 55.0 |
| 4 | BA/HEA/AA = 95/3.0/2.0 | 1.5% Aerosol OT-NV | 54.5 | 4.75 |
| 5 (pH 8.5) | BA/HEA/AA = 95/3.0/2.0 | 1.5% Aerosol OT-NV | 54.5 | 4.75 |

BOM = based on monomer;
NR = natural rubber (100%);
BOM + NR = based on monomer + NR;
Total solids = 55%
BA = butyl acrylate;
HEA = hydroxy ethyl acrylate;
AA = acrylic acid

TABLE 2

Latex Property Data for Examples 1-5 and Comparative Example 1

| Example | Droplet Size (nm) | Particle Size (nm) | pH | Total Solids Wt. % | Brooksfield Viscosity (cps) #2 Spindle | Scrap (ppm) |
|---|---|---|---|---|---|---|
| 1a | 255 | 300 | 3.7 | 54.5 | 235 @ 12 RPM | 60 |
| 1b | 260 | 300 | 3.8 | 54.5 | — | 105 |
| 1c | 268 | 305 | 3.8 | 55.0 | — | 75 |
| Comparative Example 1 | n/a | 235 | 3.9 | 53.8 | 470 @ 12 RPM | >10,000 |
| 2a | n/a | 215 | 3.9 | 54.2 | 400 @ 12 RPM | 20 |
| 2b | | 275 | 4.0 | 55.4 | — | 50 |
| 2c | | 190 | 4.1 | 54.2 | — | 270 |
| 2d | | 234 | 4.2 | 54.3 | — | 30 |
| 3 | n/a | 660 | 9.9 | 55.0 | 130 @ 12 RPM | n/a |
| 4 | n/a | 215, 660 | 4.0 | 54.5 | 685 @ 12 RPM | — |
| 5 | n/a | 215, 660 | 8.5 | 54.5 | 8800 @ 3 RPM | — |

TABLE 3

Adhesive Properties (Dry Film Thickness = 1 micron)

| Example | Loop Tack (#/in) | 180° Peel Strength (#/in) | Polyken Probe Tack (g) | Rolling Ball Tack (inches) | * Room Temp. Hold Power (min) | * 50° C. Hold Power (hours) | Quick Stick (oz/in) |
|---|---|---|---|---|---|---|---|
| 1b | 1.1 | 0.8 | 480 | 13.3 | 893 | >100 | 6.2 |
| 2c | 1.6 | 2.1 | 489 | 8.4 | 21 | <0.5 | 7.5 |
| 4 | 0.1 | 0.08 | 39 | >18 | 556 | >100 | 0.9 |
| 5 | 1.0 | 0.9 | 435 | 7.5 | 79 | <0.5 | 7.0 |
| 3 | 1.0 | 0.6 | 307 | 8.8 | 37 | <0.5 | 4.9 |

* 0.5 × 0.5 inch area on Mylar (polyethylene terephthalate) substrate

Table 3 lists results of adhesive testing. Example 1b reveals that the natural rubber modified acrylic hybrid resin made via a mini-emulsion process provides superior adhesive shear strength (room temperature and 50° C. hold power, 0.5"×0.5" strip) relative to either an all acrylic or a natural rubber latex/acrylic blend. The natural rubber latex alone exhibits good shear strength, but has much poorer tack properties than the other samples.

TABLE 4

Adhesive Properties (Dry Film Thickness = 1 micron)

| Example | Loop Tack (#/in) | 180° Peel Strength (#/in.) | Rolling Ball Tack (in.) | * Room Temp. Hold Power (hours) | * 50° C. Hold Power (hours) |
|---|---|---|---|---|---|
| 1a | 1.02 | 0.44 | 5.2 | >80 | >80 |
| 1b | 0.67 | 1.02 | 7.4 | >80 | >80 |
| 1c | 0.76 | 0.46 | 7.2 | >80 | >80 |
| Average | 0.81 | 0.51 | 6.6 | >80 | >80 |
| 2b | .69 | .55 | 4.6 | 26 | 1.0 |
| 2c | .55 | .43 | 6.0 | 10 | 0.1 |
| 2d | .98 | .63 | 3.9 | 4.4 | 0.3 |
| Average | 0.74 | 0.53 | 4.8 | 13 | 0.5 |

* 0.75 × 0.75 inch area on Mylar (polyethylene terephthalate) substrate

Table 4 list results of adhesive testing of multiple samples of both the hybrid and all-acrylic compositions. Again the hybrid resins exhibit superior shear strength (room temperature and 50° C. hold power, 0.75"×0.75" strip) relative to the all-acrylic samples.

Figure 1:
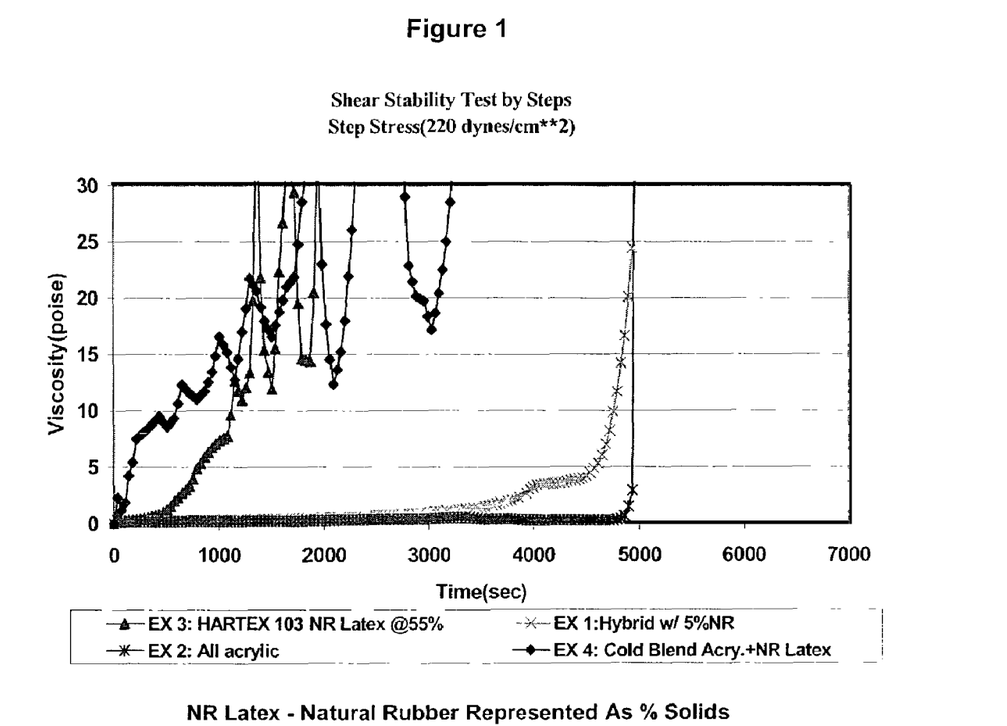
FIG. 1 is a graphical representation depicting viscosity data versus stability over time of an all acrylic polymer latex, a natural rubber latex; and a blend of all acrylic polymer with a natural rubber resin versus the rubber modified acrylic resins of the invention.
Figure 2:
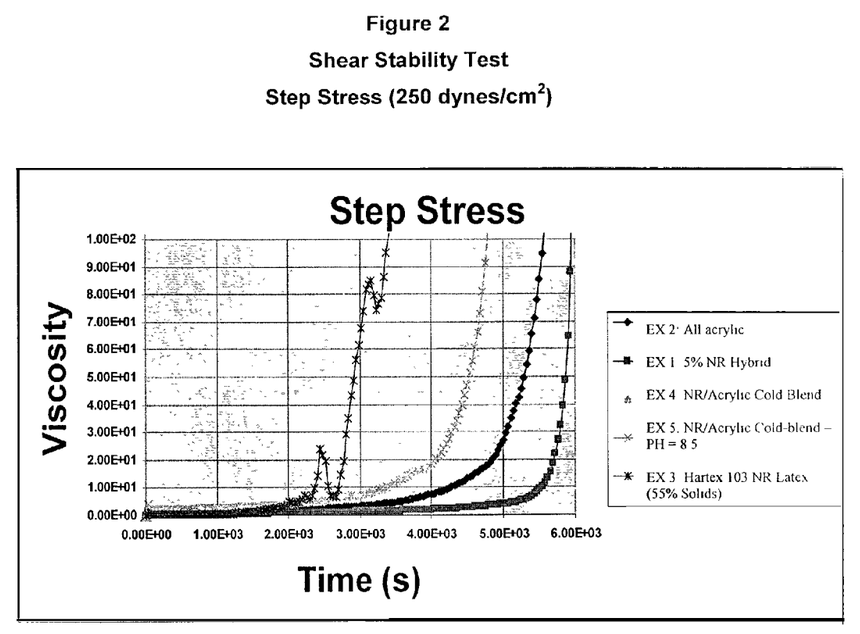
FIG. 2 is a graphical representation depicting additional data for polymers described in FIG. 1.

FIGS. 1 and 2, attached hereto, depict Examples 1-5 which correspond directly to Examples 1-5 as described in the Tables and Examples section herein. FIGS. 1 and 2 show that natural rubber latex exhibits poor mechanical stability. A rubber modified acrylic hybrid latex made via a mini-emulsion polymerization process exhibits much better mechanical stability than the natural rubber latex, better mechanical stability than a blend of natural rubber latex with an acrylic latex, and equal or better mechanical stability than an all acrylic latex. (A natural rubber latex/all acrylic blend without pH adjustment to 8.5 prior to addition of the natural rubber latex exhibits very poor mechanical stability.) The Examples shown in FIGS. 1 and 2 are the same as Examples 1 and 2 show that homogenization of the emulsion is required in order to form a stable latex containing a preformed hydrophobic polymer such as natural rubber. Only the hybrid latex formed using a mini-emulsion process exhibits both high adhesive shear strength and good mechanical stability.

The invention has been described in detail with particular reference to preferred embodiments thereof, but it will be understood that variations and modifications can be effected within the spirit and scope of the invention.

We claim:

1. A pressure sensitive adhesive composition comprising a rubber modified acrylic and/or vinyl resin comprising the mini-emulsion polymerization product of at least one rubber compound substantially dissolved in at least one acrylic and/or vinyl monomer, wherein said resin comprises a rubber portion derived from said rubber compound and an acrylic and/or vinyl portion derived from said acrylic and/or vinyl monomer, wherein said pressure sensitive adhesive composition exhibits a 50° C. hold power of at least 100 hours.

2. The pressure sensitive adhesive composition of claim 1 wherein said mini-emulsion polymerization comprises the steps of: substantially dissolving at least one rubber compound in at least one acrylic monomer and/or vinyl monomer to form a rubber/acrylic monomer and/or vinyl monomer solution; dispersing said rubber/acrylic and/or vinyl monomer solution in an aqueous medium to form a pre-emulsion; shearing said pre-emulsion to form a mini-emulsion; and subsequently polymerizing said mini-emulsion.

3. The pressure sensitive adhesive composition of claim 1, wherein said at least one rubber compound is selected from one or more of the group consisting of natural rubber, butyl rubber, isoprene rubber, chloroprene rubber, neoprene rubber, polybutadiene rubber, nitrile-butadiene rubber, styrene-butadiene rubber, polypentanamer, and ethylene-propylene-diene terpolymer.

4. The pressure sensitive adhesive composition of claim 3 wherein said at least one rubber compound is natural rubber.

5. The pressure sensitive adhesive composition of claim 4 wherein all of said rubber compounds consist of natural rubber.

6. The pressure sensitive adhesive composition of claim 1, wherein said acrylic monomer and/or vinyl monomer is selected from the group consisting of styrene, a-methyl styrene, vinyl naphthalene, vinyl toluene, chloromethyl styrene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, lauryl methacrylate, lauryl acrylate, octyl acrylate, octyl methacrylate, glycidyl methacrylate, allyl methacrylate, vinyl methacrylate, acetoacetoxyethyl acrylate, acetoacetoxyethyl methacrylate, acetoacetoxypropyl acrylate, acetoacetoxypropyl methacrylate, hydroxybutenyl methacrylate, the allyl ester of maleic acid, the diallyl ester of maleic acid, poly(allyl glycidyl ether), alkyl crotonates, vinyl cetate, di-n-butyl maleate, di-octylmaleate, acrylonitrile, diacetone acrylamide, acrylamide, methacrylmide, hydroxyethyl methacrylate, hydroxyethyl acrylate, acrylonitrile, t-butylaminoethyl methacrylate, dimethylaminoethyl methacrylate, diethylaminoethyl methacrylate, N, N-dimethylaminopropyl methacrylamide, 2-t-butylaminoethyl methacrylate, N, N-dimethylaminoethyl acrylate, N-(2-methacryloyloxy-ethyl)ethylene urea, and methacrylamidoethylethylene urea.

7. The pressure sensitive adhesive composition of claim 6 wherein said acrylic monomer is selected from the group consisting of butyl acrylate and ethylhexyl acrylate.

8. The pressure sensitive adhesive composition of claim 6 having a glass transition temperature of 20° C. or less as determined by differential scanning calorimetry.

9. The pressure sensitive adhesive composition of claim 8 having a glass transition temperature of from 10° C. to −60° C. as determined by differential scanning calorimetry.

10. A pressure sensitive adhesive composition comprising water and a rubber modified acrylic and/or vinyl hybrid resin, wherein said rubber modified acrylic and/or vinyl hybrid resin comprises the mini-emulsion polymerization product of at least one rubber compound substantially dissolved in at least one acrylic monomer and/or vinyl monomer, wherein said pressure sensitive adhesive composition exhibits a 50° C. hold power of at least 100 hours.

11. The pressure sensitive adhesive composition of claim 10 comprising a rubber compound which is substantially dissolved in at least one acrylic monomer and/or vinyl monomer to form a solution and the resulting solution is dispersed in an aqueous medium to form a pre-emulsion, the pre-emulsion is then sheared to form a mini-emulsion, and the mini-emulsion is subsequently polymerized.

12. The pressure sensitive adhesive composition of claim 10 comprising one or more additives selected from the group consisting of tackifiers, plasticizers, coalescing agents, solvents, leveling aids and preservatives.

13. The pressure sensitive adhesive composition of claim 12 wherein said one or more additives are tackifiers.

14. The pressure sensitive adhesive composition of claim 13 wherein said tackifiers are selected from the group consisting .of hydrocarbon resins, synthetic polyterpenes, rosins, rosin derivatives, rosin esters, and natural terpenes.

15. The pressure sensitive adhesive composition of claim 14 comprising one or more tackifiers selected from the group consisting of (1) natural and modified rosins and the hydrogenated derivatives thereof; (2) glycerol and pentaerythritol esters of natural and modified rosins and the hydrogenated derivatives thereof; (3) polyterpene resins and hydrogenated polyterpene resins and hydrogenated derivatives thereof; (4) phenolic modified terpene resins and hydrogenated derivatives thereof; (5) aliphatic petroleum and hydrogenated aliphatic petroleum hydrocarbon resins and the hydrogenated derivatives thereof; (6) aromatic hydrocarbon resins and the hydrogenated derivatives thereof; and (7) alicyclic petroleum hydrocarbon resins and the hydrogenated derivatives thereof.

16. The pressure sensitive adhesive composition of claim 10, wherein said rubber compound is selected from the group consisting of natural rubber, isoprene rubber, butyl rubber, chloroprene rubber, neoprene rubber, polybutadiene rubber, nitrile-butadiene rubber, styrene-butadiene rubber, polypentanamer, and ethylene-proplyene-diene terpolymer.

17. The pressure sensitive adhesive composition of claim 16 wherein at least one of said rubber compounds is natural rubber.

18. The pressure sensitive adhesive composition of claim 17 wherein all of said rubber compounds consist of natural rubber.

19. The pressure sensitive adhesive composition of claim 10, wherein said acrylic monomer and/or vinyl monomer is selected from the group consisting of styrene, a-methyl styrene, vinyl naphthalene, vinyl toluene, chloromethyl styrene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, lauryl methacrylate, lauryl acrylate, octyl acrylate, octyl methacrylate, glycidyl methacrylate, allyl methacrylate, vinyl methacrylate, acetoacetoxyethyl acrylate, acetoacetoxyethyl methacrylate, acetoacetoxypropyl acrylate, acetoacetoxypropyl methacrylate, hydroxybutenyl methacrylate, the allyl ester of maleic acid, the diallyl ester of maleic acid, poly(allyl glycidyl ether), alkyl crotonates, vinyl acetate, di-n-butyl maleate, di-octylmaleate, acrylonitrile, diacetone acrylamide, acrylamide, methacrylmide, hydroxyethyl methacrylate, hydroxyethyl acrylate, acrylonitrile, t-butylaminoethyl methacrylate, dimethylaminoethyl methacrylate, diethylaminoethyl methacrylate, N, N-dimethylaminopropyl methacrylamide, 2-t-butylaminoethyl methacrylate, N, N-dimethylaminoethyl acrylate, N-(2-methacryloyloxy-ethyl)ethylene urea, and methacrylamidoethylethylene urea.

20. The pressure sensitive adhesive composition of claim 19 wherein said acrylic monomer is selected from the group consisting of butyl acrylate and ethylhexyl acrylate.

21. The pressure sensitive adhesive composition of claim 10 wherein the acrylic portion and/or vinyl portion of said hybrid latex comprises a total of 90 to 98 weight % of the total solids of the latex.

22. The pressure sensitive adhesive composition of claim 10 wherein said rubber modified acrylic and/or vinyl hybrid resin has a glass transition temperature of 20° C. or less as determined by differential scanning calorimetry.

23. The pressure sensitive adhesive composition of claim 22 wherein said rubber modified acrylic and/or vinyl hybrid resin has a glass transition temperature of from 10° C. to −60° C. as determined by differential scanning calorimetry.

24. The pressure sensitive adhesive composition of claim 10 further comprising an initiator.

25. The pressure sensitive adhesive composition of claim 24 wherein said initiator is selected from the group consisting of ammonium persulfate, ammonium carbonate, hydrogen peroxide, t-butyl hydroperoxide, ammonium sulfate, alkali sulfate, di-benzoyl peroxide, lauryl peroxide, di-tertiarybutylperoxide, 2,2-azobisisbutyronitrile, and benzoyl peroxide.

26. The pressure sensitive adhesive composition of claim 10 further comprising a reducing agent.

27. The pressure sensitive adhesive composition of claim 26 wherein said reducing agent is selected from the group consisting of sodium bisulfite, sodium hydrosulfite, sodium formaldehyde sulfoxylate, ascorbic acid, and isoascorbic acid.

28. The pressure sensitive adhesive composition of claim 10 further comprising a catalyst.

29. The pressure sensitive adhesive composition of claim 28 wherein said catalyst is selected from the group consisting of transition metal compounds and driers.

30. The pressure sensitive adhesive composition of claim 29 wherein said catalyst is selected from the group consisting of ferrous sulfate heptahydrate, ferrous chloride, cupric sulfate, cupric chloride, cobalt acetate, cobaltous sulfate, and mixtures thereof.

31. The pressure sensitive adhesive composition of claim 10 further comprising a surfactant.

32. The pressure sensitive adhesive composition of claim 31 wherein said surfactant is at least one polymerizable surfactant.

33. The pressure sensitive adhesive composition of claim 31 further comprising a surfactant and an initiator.

34. The pressure sensitive adhesive composition of claim 31 wherein said surfactant represents about 0.15% to about 8% by weight of the total solids of the aqueous composition.

35. The pressure sensitive adhesive composition of claim 31 comprising a surfactant selected from the group consisting of alkali alkylsulfate, ammonium alkylsulfate, alkylsulfonic acid, alkylsulfonic fatty acid, oxyethylated alkylphenol, sulfosuccinates, acetylenic diols, and ethyloxylated acetylenic diols.

36. The pressure sensitive adhesive composition of claim 10 wherein the acrylic and/or vinyl portion of the latex is present at a total of about 70 to about 99 weight % based on the total solids of the latex.

37. The pressure sensitive adhesive composition of claim 1 wherein said acrylic and/or vinyl portion comprises 90 to 98 weight % of the resin.

38. A pressure sensitive adhesive composition comprising a rubber modified acrylic and/or vinyl resin comprising a rubber portion derived from at least one rubber compound and an acrylic and/or vinyl portion derived from at least one acrylic and/or vinyl monomer, wherein said resin has a glass transition temperature of about 20° C. or less determined by differential scanning calorimetry, wherein said pressure sensitive adhesive composition exhibits a 50° C. hold power of at least 100 hours.

39. The pressure sensitive adhesive composition of claim 38 wherein said glass transition temperature is from 10° C. to −60° C.

40. The pressure sensitive adhesive composition of claim 38 wherein said acrylic and/or vinyl portion comprises 90 to 98 weight % of the resin.

41. The pressure sensitive adhesive composition of claim 38 wherein said at least one rubber compound is selected from one or more of the group consisting of natural rubber, butyl rubber, isoprene rubber, chloroprene rubber, neoprene rubber, polybutadiene rubber, nitrile-butadiene rubber, styrene-butadiene rubber, polypentanamer, and ethylene-propylenediene terpolymer.

42. The pressure sensitive adhesive composition of claim 41 wherein said at least one rubber compound is natural rubber.

43. The pressure sensitive adhesive composition of claim 42 wherein all of said rubber compounds consist of natural rubber.

44. The pressure sensitive adhesive composition of claim 38, wherein said acrylic monomer and/or vinyl monomer is selected from the group consisting of styrene, a-methyl styrene, vinyl naphthalene, vinyl toluene, chloromethyl styrene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, lauryl methacrylate, lauryl acrylate, octyl acrylate, octyl methacrylate, glycidyl methacrylate, allyl methacrylate, vinyl methacrylate, acetoacetoxyethyl acrylate, acetoacetoxyethyl methacrylate, acetoacetoxypropyl acrylate, acetoacetoxypropyl methacylate, hydroxybutenyl methacrylate, the allyl ester of maleic acid, the diallyl ester of maleic acid, poly(allyl glycidyl ether), alkyl crotonates, vinyl cetate, di-n-butyl maleate, di-octylmaleate, acrylonitrile, diacetone acrylamide, acrylamide, methacrylmide, hydroxyethyl methacrylate, hydroxyethyl acrylate, acrylonitrile, t-butylaminoethyl methacrylate, dimethylaminoethyl methacrylate, diethylaminoethyl methacrylate, N, N-dimethylaminopropyl methacrylamide, 2-t-butylaminoethyl methacrylate, N ,N-dimethylaminoethyl acrylate, N-(2-methacryloyloxy-ethyl)ethylene urea, and methacrylamidoethylethylene urea.

45. The pressure sensitive adhesive composition of claim 44 wherein said acrylic monomer is selected from the group consisting of butyl acrylate and ethylhexyl acrylate.

46. The pressure sensitive adhesive composition of claim 38 wherein said resin is a product of mini-emulsion polymerization.

47. The pressure sensitive adhesive composition of claim 46 wherein said rubber compound is substantially dissolved in said acrylic and/or vinyl monomer at commencement of said mini-emulsion polymerization.

48. The pressure sensitive adhesive composition of claim 1 wherein said rubber portion comprises 2 to 10 weight % of the resin.

49. The pressure sensitive adhesive composition of claim 1 wherein said composition exhibits a rolling ball tack of less than 13.3 inches.

50. The pressure sensitive adhesive composition of claim 10 wherein said rubber portion of said hybrid latex comprises 2 to 10 weight % of the total solids of the latex.

51. The pressure sensitive adhesive composition of claim 10 wherein said composition exhibits a rolling ball tack of less than 13.3 inches.

52. The pressure sensitive adhesive composition of claim 38 wherein said rubber portion comprises 2 to 10 weight % of the resin.

53. The pressure sensitive adhesive composition of claim 38 wherein said composition exhibits a rolling ball tack of less than 13.3 inches.

* * * * *